A. HUEGELE.
HULLING MACHINE.
APPLICATION FILED FEB. 6, 1917.
1,250,462.
Patented Dec. 18, 1917.
2 SHEETS—SHEET 1.
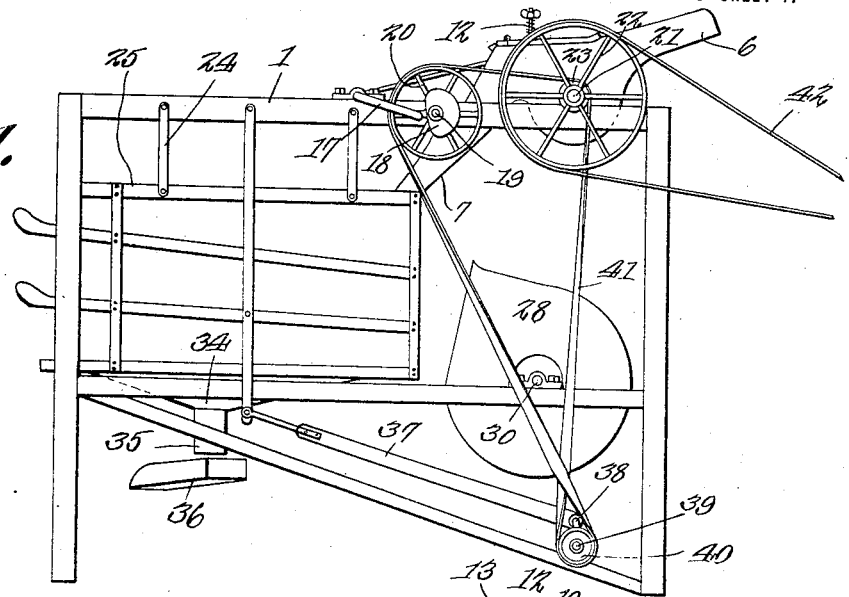
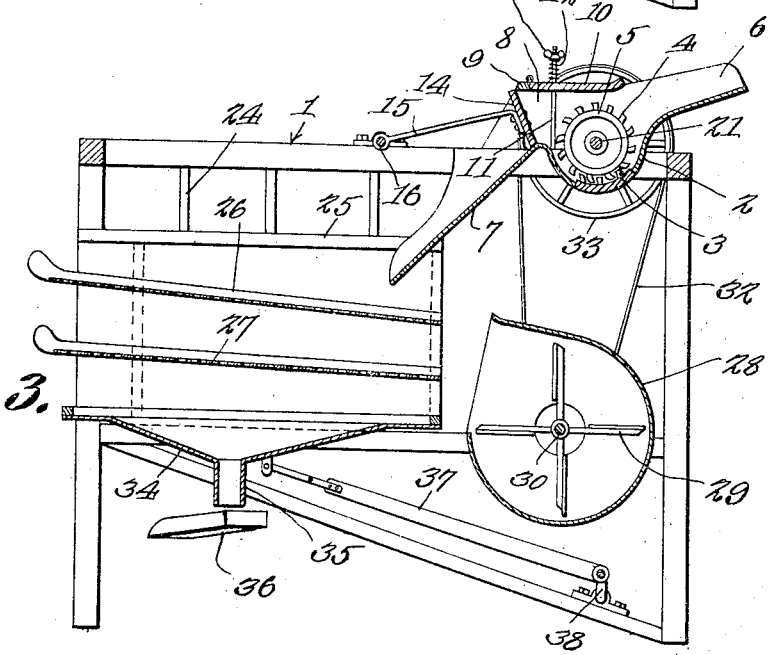
Witness
Inventor
Alvin Huegele
By
Attorneys

A. HUEGELE.
HULLING MACHINE.
APPLICATION FILED FEB. 6, 1917.

1,250,462.

Patented Dec. 18, 1917.
2 SHEETS—SHEET 2.

Witness
J. R. Fowler
L. C. Simpson

Inventor
Alvin Huegele
By C. A. Snow & Co.
Attorneys

UNITED STATES PATENT OFFICE.

ALVIN HUEGELE, OF UVALDE, TEXAS.

HULLING-MACHINE.

1,250,462.

Specification of Letters Patent.

Patented Dec. 18, 1917.

Application filed February 6, 1917. Serial No. 146,949.

*To all whom it may concern:*

Be it known that I, ALVIN HUEGELE, a citizen of the United States, residing at Uvalde, in the county of Uvalde and State of Texas, have invented a new and useful Hulling-Machine, of which the following is a specification.

This invention relates to machines for hulling pecan nuts and the like, one of the objects being to provide simple and efficient mechanism for removing the hulls from green pecans and for blowing out leaves, trash and the like, so that the nuts will be delivered in a clean condition.

A further object is to provide improved means for controlling the discharge of the nuts to the separators, the nuts and hulls being supplied intermittently to said means from the threshing mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is an elevation of one side of the machine.

Fig. 3 is a vertical longitudinal section.

Figure 2:
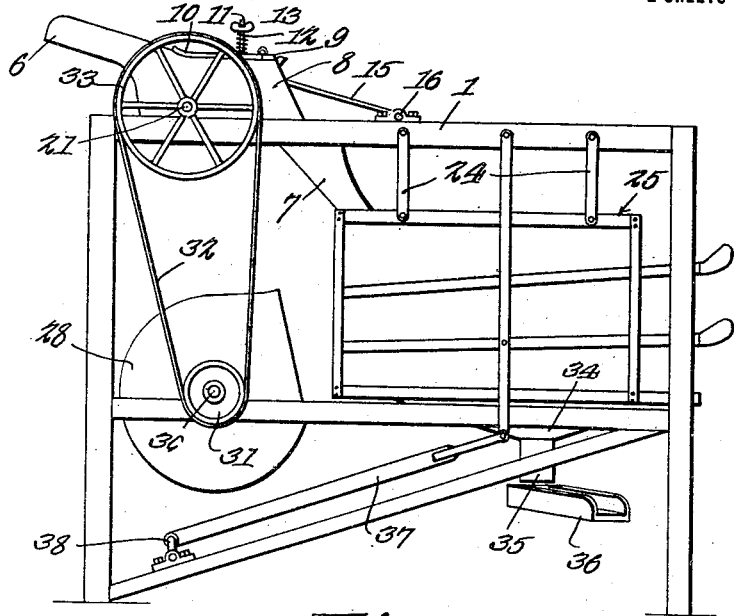
Fig. 2 is an elevation of the opposite side thereof.
Figure 4:
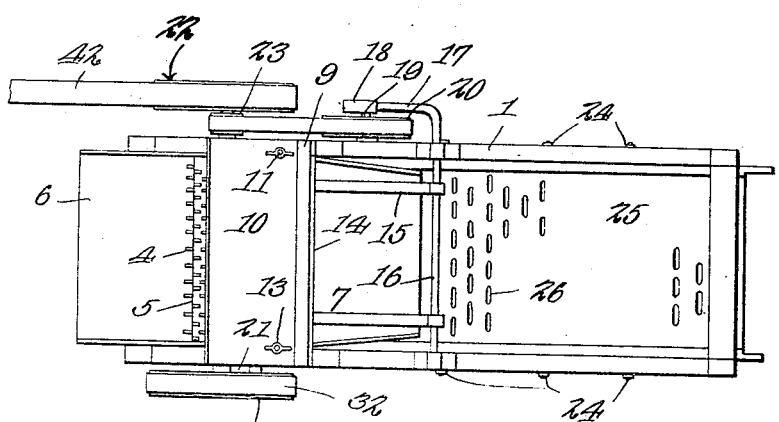
Fig. 4 is a plan view.

Referring to the figures by characters of reference 1 designates a supporting structure to which is secured a transverse concave 2 having upstanding teeth 3 upon the bottom thereof designed to project between the paths of teeth 4 extending from the periphery of a threshing cylinder 5. A feed chute 6 discharges downwardly into the concave and a discharge chute 7 extends downwardly from the concave, the threshing cylinder being interposed between the two chutes. The side walls 8 of the concave are extended upwardly beyond the ends of the threshing cylinder and are connected by a cross strip 9 to which is hingedly secured a cover plate 10. This cover plate has restraining rods 11 extending through it, the said rods being located close to the side walls 8 and those portions of the rods located above the cover plate being provided with coiled springs 12 and with wing nuts 13 engaging the springs. Thus the plate 10 is free to swing upwardly against the action of the springs 12 and the tension of the springs can be regulated by means of the nuts 13.

The space between the strip 9 and the bottom of the upper portion of the outlet chute 7 is adapted to be closed by a gate 14 fixedly connected to arms 15 which radiate from a transverse shaft 16. This shaft has an arm 17 at one end which projects into engagement with a cam 18 secured to a short transverse shaft 19 to which is also secured a pulley 20.

The shaft 21 of the threshing cylinder has a pulley 22 at one end for driving it while secured to the same end of this shaft is a small pulley 23.

Depending from each side of the upper portion of the structure 1 are pivoted hangers 24 and these hangers are pivotally attached to and support a skeleton frame 25 in which are arranged superposed screens 26 and 27. These screens are inclined downwardly toward a blower casing 28 in which is arranged a blower 29 revoluble with a shaft 30. This shaft has a pulley 31 adapted to receive motion through a belt 32 from a pulley 33 on the shaft 21 of the threshing cylinder.

A hopper 34 is arranged under and carried by the skeleton frame 25 and is adapted to collect all material discharged downwardly through the screens. This hopper has an outlet spout 35 suspended above a laterally extending delivery chute 36, the chute being of such width as to always extend under the spout 35 even though said spout is oscillated.

For the purpose of oscillating the skeleton frame 25 and the parts carried thereby, a pitman 37 is connected to the lower portion of the skeleton frame and to a crank 38 arranged at the center of a transverse shaft 39. This shaft has a pulley 40 adapted to receive motion from a crossed belt 41, this belt being extended over the pulley 20 and the pulley 23.

In using the apparatus the shaft 21 is driven by any suitable power which can be transmitted thereto through pulley 22 and a belt 42. Thus the threshing cylinder will be rotated above the concave and the belt 41 will drive the shaft 19 and cause cam 18 to intermittently actuate arm 17 to cause the gate 14 to be raised and lowered relative to the chute 7. Motion will also be transmitted to the shaft 39 with the result that the skeleton frame 25 will be rapidly reciprocated, thus to constantly agitate any material resting on the screens 26 and 27 and on the hopper 34. The blower 29 will be driven so as to direct a blast of air under and over the two screens and substantially in the direction of their length.

The articles to be hulled are placed in the feed trough or spout 6 and will gravitate onto the concave 2 where they will be engaged and threshed by the teeth 3 and 4 so that the hulls will be loosened. Should any hulls or other material become wedged in the apparatus the cover plate 10 will move upwardly against the action of the springs 12, thus to prevent choking. After the hulling operation has gone on for a few moments the gate 14 will open and the hulled material will gravitate down the chute 7 onto the upper screen 26. Undesirable trash will be discharged from this screen as tailings or else will be blown therefrom, while the nuts will fall through the screen onto the next screen where further separation will take place and will finally drop into the hopper 34 and be directed into the outlet chute 36.

It has been found in practice that a machine such as described is especially useful in hulling green pecans, leaving them perfectly clean for packing and shipping.

What is claimed is:—

1. The combination with hulling mechanism, separating mechanism, and a chute for directing material from the hulling mechanism to the separating mechanism, of a gate normally closing communication between the hulling mechanism and the chute, and means operating in timed relation with the hulling mechanism for opening and closing the gate, said means including a shaft, a connection between the shaft and gate, an arm extending from the shaft, and a revoluble cam engaging and actuating the arm.

2. The combination with hulling mechanism, separating mechanism, and a chute for directing material from the hulling mechanism to the separating mechanism, of a sliding gate normally closing communication between the hulling mechanism and the chute, a shaft, an arm connecting such shaft to the gate, another arm extending from the shaft, a continually rotating shaft, and a cam upon this shaft and movable to abruptly engage the last named arm to open the gate, maintain the gate in full opened position, and abruptly release said arm to allow the gate to close.

3. The combination with a concave, a spring-pressed cover plate extending over the concave, and a toothed cylinder mounted for rotation between the concave and cover plate, of a feed chute opening into the concave, a delivery chute extending from the concave, a gate normally closing the space between the cover plate and the upper end of the bottom of the delivery chute, and means for abruptly opening the gate, maintaining the gate in full opened position, and abruptly closing the gate after a predetermined number of revolutions of the cylinder.

In testimony that I claim the foregoing as my own, I have hereto affixed my signature in the presence of two witnesses.

ALVIN HUEGELE

Witnesses:
ZENA DALRYMPLE,
M. O. LANGFORD.